United States Patent
Long et al.

(12) United States Patent (10) Patent No.: US 7,260,117 B2
(45) Date of Patent: Aug. 21, 2007

(54) SYNCHRONIZING INITIAL HANDSHAKE IN ADSL ANNEX C TO TTR

(75) Inventors: Guozhu Long, Newark, CA (US); Les Brown, Streetsville (CA); Sanjay Gupta, Union City, CA (US)

(73) Assignee: Centillium Communications, Inc., Fremont, CA (US)

( * ) Notice: Subject to any disclaimer, the term of this patent is extended or adjusted under 35 U.S.C. 154(b) by 1005 days.

(21) Appl. No.: 10/187,388

(22) Filed: Jun. 28, 2002

(65) Prior Publication Data

US 2003/0189952 A1 Oct. 9, 2003

Related U.S. Application Data

(60) Provisional application No. 60/363,267, filed on Mar. 8, 2002, provisional application No. 60/380,484, filed on May 13, 2002.

(51) Int. Cl.
*H04J 3/06* (2006.01)
(52) U.S. Cl. ....................................................... 370/503
(58) Field of Classification Search ................ 370/292, 370/294, 504; 379/417
See application file for complete search history.

(56) References Cited

U.S. PATENT DOCUMENTS

| | | | |
|---|---|---|---|
| 6,266,347 B1 * | 7/2001 | Amrany et al. | 370/478 |
| 6,393,051 B1 * | 5/2002 | Koizumi et al. | 375/220 |
| 6,449,316 B1 * | 9/2002 | Matsumoto et al. | 370/507 |
| 6,580,752 B1 * | 6/2003 | Amrany et al. | 370/478 |
| 6,628,704 B1 * | 9/2003 | Long et al. | 370/292 |
| 6,628,738 B1 * | 9/2003 | Peeters et al. | 375/371 |
| 6,724,849 B1 * | 4/2004 | Long et al. | 375/371 |
| 6,747,992 B1 * | 6/2004 | Matsumoto | 370/468 |
| 6,865,190 B2 | 3/2005 | Abbas et al. | |
| 6,993,068 B1 | 1/2006 | Isaksson et al. | |
| 7,058,152 B2 * | 6/2006 | Long et al. | 375/371 |
| 7,072,386 B1 | 7/2006 | Hasegawa et al. | |
| 2001/0043620 A1 * | 11/2001 | Amatsubo et al. | 370/509 |
| 2002/0008525 A1 * | 1/2002 | Seagraves et al. | 324/500 |
| 2004/0105454 A1 * | 6/2004 | Okamura | 370/413 |
| 2005/0068985 A1 | 3/2005 | Li | |

* cited by examiner

*Primary Examiner*—Chi Pham
*Assistant Examiner*—Anh-Vu Ly
(74) *Attorney, Agent, or Firm*—Fenwick & West LLP (57) ABSTRACT

Techniques for establishing TTR indication in ADSL Annex C based communication systems are disclosed. The techniques enable, for example, hyperframe alignment and synchronized initialization procedures (e.g., G.hs).

9 Claims, 8 Drawing Sheets

| |  FEXT$_R$ training symbol |  NEXT$_R$ training symbol |

Fig. 1a

FEXT$_C$ symbol

NEXT$_C$ symbol

SYNCHRONIZING INITIAL HANDSHAKE IN ADSL ANNEX C TO TTR

RELATED APPLICATIONS

This application claims the benefit of U.S. Provisional Applications No. 60/363,267, filed Mar. 8, 2002, and No. 60/380,484, filed May 13, 2002. Both of these applications are herein incorporated in their entirety by reference. In addition, this application is related to U.S. application Ser. No. 10/187,384, filed Jun. 28, 2002, entitled "Synchronizing ADSL Annex C Transceivers to TTR."

FIELD OF THE INVENTION

The invention relates to telecommunications, and more particularly, to TTR indication techniques in ADSL Annex C based communication systems thereby enabling ADSL Annex C transceivers to synchronize their transmission to the network timing reference (TTR) signal.

BACKGROUND OF THE INVENTION

The Telecommunications Standards Section of the International Telecommunication Union (designated as ITU-T) develops recommendations to facilitate the interoperation of telecommunication networks. Two of these recommendations are designated G.992.1 and G.992.2, which define asymmetric digital subscriber line (ADSL) transceiver technologies.

The G.992.1 and G.992.2 standards both use a multicarrier modulation scheme referred to as discrete multi-tone (DMT) modulation technology. DMT modulation employs multiple carriers or "tones" for both upstream and downstream communication. For example, downstream communication per G.992.1 uses carriers up to index 255, while downstream communication per G.992.2 uses carriers only up to index 127. By working with a large number of carriers rather than a single carrier, the available channel capacity can be maximized thereby optimizing performance of the transmission bandwidth.

Both G.992.1 and G.992.2 have an Annex C that defines a special recommendation for ADSL transceivers under the time compression multiplexing—integrated services digital network (TCM-ISDN) noise environment. Reference to "Annex C" may be to either or both of G.992.1 and G.992.2. TCM-ISDN is defined in ITU-T recommendation G.961 Appendix III. Recommendation G.961 Appendix III describes a ping-pong scheme where the transmission (and reception) of data between two transceivers is performed under the control of a 400 Hz clock referred to as the TCM-ISDN timing reference (TTR). G.992.1 and G.992.2 Annex C central office side transceivers transmit a TTR indication signal during transceiver training so that the customer premise side transceiver can detect and lock its receiver and transmitter to the TTR clock. This TTR indication signal is tone 48 with phase reversal per current versions of G.992.1 and G.992.2. The central office transceiver (ATU-C) transmits the data stream basically in the first half of the TTR period, and the customer transceiver (ATU-R) transmits basically in the second half of the TTR period. Such a ping pong scheme is particularly useful in the context of a communication channel that has high crosstalk interference levels due to the likes of poor quality insulators (e.g., pulp based insulation) within a cable bundle where simultaneous transmission by both the central office and customer transceivers is difficult.

Hyperframe Alignment Based on TTR Detection

The TTR is used to lock the ATU-C local clock frequency, which controls the ATU-C A/D and D/A sampling rates, and the transmitter and receiver symbol rates. The ATU-C transmitter checks the phase of the system TTR, and locks its hyperframe window to the TTR. At the ATU-R, the receiver tracks the received signal from ATU-C transmitter, and locks the local clock to the ATU-C clock frequency. The ATU-R also detects the hyperframe pattern from the received TTR indication signal from the ATU-C, and aligns its symbol counter to the hyperframe pattern (generally referred to as hyperframe alignment). The symbol counter is used to track the symbol index, and is incremented by 1 for each symbol. The counter is reset to zero when it reaches 345 (note that there are 345 symbols in a hyperframe). Thus, the transmitter and receiver are synchronized to the hyperframe. This alignment process is performed during transceiver training of the communication link between two ADSL modems.

Annex C defines a dual bitmap mode (DBM) encoding technique for providing dual bitmaps that are switched synchronized with the hyperframe pattern that is synchronized to the TTR to provide a data stream having dual bit rates. The technique is based on the observation that for short to medium local loops (e.g., less than about three kilometers), the channel signal-to-noise ratio (SNR) can be sufficiently high during NEXT interference to transmit data at a low bit rate. Thus, under certain conditions DBM allows full-duplex operation of TCM-IDSN transceivers by employing different bit rates under NEXT and FEXT interference, respectively. In this sense, the communication channel operating under DBM in a TCM-ISDN environment is effectively two communication channels: one is a FEXT channel and the other is a NEXT channel. A single bitmap mode (SBM, more specifically referred to as FEXT bitmap mode or FBM) encoding technique is also provided. Here, the central office and the remote transceivers transmit data only in FEXT time, and do not transmit data simultaneously (half-duplex mode).

In DBM encoding, bit rates can be changed by changing the bitmaps used to encode the symbols to be transmitted. As is understood by those skilled in the art, a "bitmap" determines the number of bits that can be encoded into each subchannel in a symbol. A "symbol" is the basic unit of information transmitted by the transceiver. The number of bits encoded into each subchannel in a symbol is limited by the quality of the communication channel. The quality of the communication channel can be represented by its SNR. Thus, a system employing DBM includes two bitmaps for providing different data rates: one bitmap for NEXT time and one bitmap for FEXT time. A system employing FBM uses only one bitmap (a FEXT bitmap) since no data signal is transmitted in NEXT time. Because each bitmap used in DBM is associated with different bit rates, the transition from one bit map to the other must be detected to ensure a compatible transmitter-receiver pair. As the standardized frame rate is not a multiple of 400 Hz TTR signal, identifying the boundaries between the NEXT and FEXT channels is not trivial.

According to G.992.1 or G.992.2 Annex C, the ATU-C uses phase changes of a single tone (tone 48) to indicate the transition between the NEXT bitmap and the FEXT bitmap. In particular, the phase of this single tone is toggled by 90 degrees at the transmitter to indicate the transition. Thus, the ATU-R receiver has to detect the phase changes, and then recognize the 345-symbol pattern of FIG. 1a in order to align to the transmitter hyperframe. On long loops and in presence of strong noise, however, it becomes very difficult to detect the phase change of tone 48, and the TTR detection becomes the bottleneck for longer reach. Furthermore, because the tone 48 TTR indication signal indicates only the transition from each bitmap, the receiver needs to search for the pattern implied in FIG. 1a to identify the hyperframe boundary and perform the alignment. This complicates the hyperframe alignment at the receiver and increases the possibility of its failure on long loops.

What is needed, therefore, is a TTR indication signal that is detectable on longer and noisier loops. In a more general sense, there is a need for synchronization of signals or procedures to the TTR.

BRIEF SUMMARY OF THE INVENTION

One embodiment of the present invention provides a method for synchronizing an initialization procedure with a timing reference signal in an ADSL Annex C communication system. The method includes transmitting a specially defined signal during one or more known symbols of an outgoing hyperframe. When detected at a receiving node, the specially defined signal establishes synchronization to the timing reference signal. A synchronized initialization procedure is therefore enabled. An alternative embodiment includes detecting a specially defined signal during one or more sets of known FEXT symbols of an incoming hyperframe to establish synchronization to the timing reference signal thereby-enabling a synchronized initialization procedure.

Another embodiment the present invention provides a device or apparatus configured to enable ADSL Annex C transceivers to synchronize their transmission to a timing reference signal. One such embodiment includes a signal generator module adapted to generate a specially defined signal that is transmitted during one or more known DMT symbols of an outgoing hyperframe. When detected at a receiving node, the specially defined signal establishes synchronization to the timing reference signal thereby enabling a synchronized procedure. An alternative embodiment includes a detector module adapted to detect a specially defined signal during one or more known DMT symbols included in an incoming hyperframe. The detection establishes synchronization to the timing reference signal thereby enabling a synchronized procedure.

Another embodiment of the present invention provides a signal for use in an ADSL Annex C communication system. The signal can be, for example, a set of tones transmitted during a plurality of known DMT symbols included in a hyperframe. Detection of the signal enables communicating transceivers included in the system to synchronize their transmissions to the timing reference signal, thereby enabling synchronized initialization procedures, hyperframe alignment, or both.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Generally, the present invention can be implemented in a communication system having a transceiver pair communicatively coupled by a transmission medium (e.g., copper twisted pair). Each communication direction (upstream and downstream) therefore includes a transmitter-receiver pair. A specially defined TTR indication signal is generated by the transmitter at the transmitting node and sent to the receiving node. The specially defined TTR indication signal is then reliably detected by the receiver thereby enabling transceivers to synchronize transmission to the TTR. Thus, hyperframe alignment, as well as synchronized initialization procedures, are enabled.

Specially Defined TTR Indication Signal

Instead of using a 90 degree phase reversal on a single tone to indicate the boundaries of the FEXT and NEXT bitmaps, one embodiment of the present invention transmits tones 33 to 64 of a REVERB-type signal only during symbols 0, 1, 2, and 3 in a given hyperframe. This specially defined signal is referred to herein as REVERB33-64. As will be apparent in light of this disclosure, other specially defined TTR indication signals can also be used here (e.g., inverse of REVERBx-y, where x-y represent a set of tones).

A processor module, for example, that is included in the ATU-C transmitter can be programmed or otherwise configured to provide the REVERB33-64 signal in a number of transmitted hyperframes. A processor module included in the ATU-R receiver can be configured to detect the known pattern of the REVERB33-64 signal in symbols 0 to 3. Once the pattern is detected in four consecutive symbols, the locations of the known symbols 0 to 3 within the hyperframe are identified. The ATU-R processor module can confirm these identified locations by detecting a second time the REVERB33-64 signal in the four consecutive symbols, which can be done in a subsequent hyperframe. In particular, once the fourth consecutive symbol having the known pattern is detected a second time, the receiver is known to be receiving symbol 3 and the hyperframe boundary is therefore known.

To ensure a robust communication, the ATU-C transmitter can be further configured to keep sending the REVERB33-

64 signal until the ATU-R responds by sending an R-REVERB1 (or some other established acknowledgement signal or flag). Thus, the REVERB33-64 signal can be transmitted in as many hyperframes as necessary until the receiving node acknowledges confirmation of alignment. If an acknowledgement is not received after a number of attempts (e.g., 5), then the transmitting transceiver can be configured to manifest an error. An appropriate action can then be taken, such as starting over again, or engaging a loop diagnostic procedure to investigate deficiencies of the current communication link, or to switch over to a new link.

Alternative TTR Indication Signals

The present invention is not intended to be limited to the embodiments described herein. Rather, the principles of the present invention can be applied in numerous embodiments. For instance, tones 33 to 64 of the DMT spectrum were chosen because they represent low frequency, downstream tones as defined in G.992.1. Such low frequency tones can be transmitted over longer distances thereby improving the "reach" of the present invention. However, other tones can be used here as well, such as a subset of tones 33 to 64 (e.g., 34 to 61), or any usable tone or tone group (e.g., tones 6 to 31 or a subset of that in an overlap spectrum application where tones 6-31 are also used by downstream) that can carry detectable information over a long range loop (e.g., greater than 5 Km). Likewise, the data patterns other than a REVERB-type pattern can be used to attribute uniqueness to the transmitted TTR indication signals. In short, any signal that can be uniquely detected at the receiving end of a long loop can be used in accordance with the principles of the present invention.

In addition, symbols other than 0 to 3 can be used. For instance, symbols 341 to 344 can be used, or any group of uniquely identifiable symbols or section of frame data that can be used to identify the offset between the transmitter and receiver frame boundaries. In one alternative embodiment, a signal having a known pattern (e.g., REVERB33-64 or REVERB6-31) is sent during symbols $N_1$ to $N_2$ (e.g., symbols 140, 141, 142, 143, and 144), and then again during symbols $N_3$ to $N_4$ (e.g., symbols 237, 238, 239, 240, and 241). Here, the specially defined signal is sent over a group of symbols twice in one hyperframe. Such an embodiment would allow hyperframe alignment to be identified (during receipt of symbols $N_1$ to $N_2$) and then confirmed (during receipt of symbols $N_3$ to $N_4$) in one hyperframe as opposed to using two or more hyperframes as previously described.

Note that the more symbols associated with the specially defined signal, the less likely the chance that the receiver would erroneously detect the signal. Thus, a more robust TTR indication is provided when the specially defined signal is transmitted during a plurality of symbols (e.g., 2 or more symbols). However, it is possible that hyperframe alignment could be achieved in accordance with the principles of the present invention by transmitting a specially defined signal during only one known symbol (assuming that the noise and interference properties of the communication link would allow for an accurate detection of that signal at the receiving node).

Transceiver Unit

Figure 2:
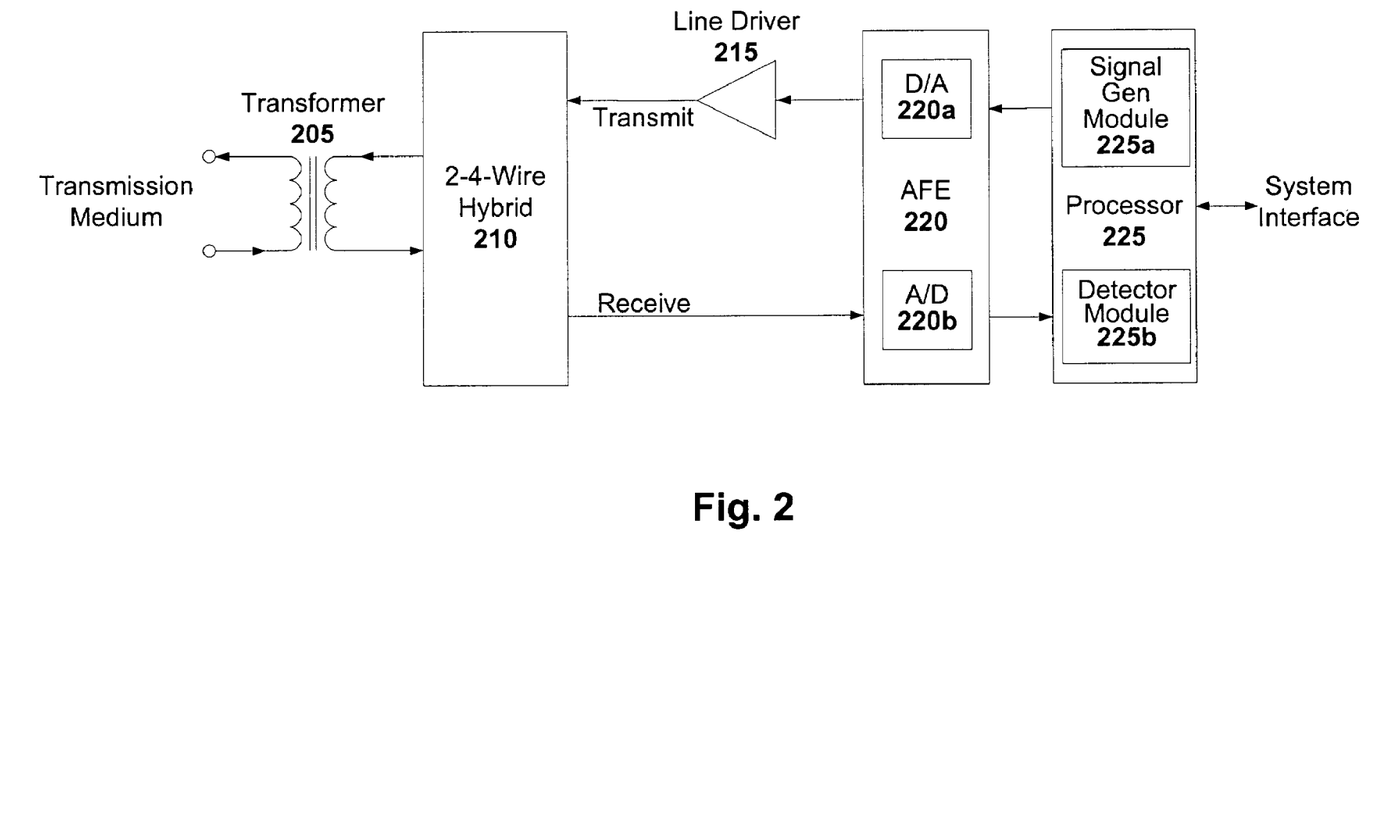
FIG. 2 is a block diagram of an ADSL modem adapted to perform hyperframe alignment in accordance with one embodiment of the present invention.

FIG. 2 is a block diagram of an ADSL modem adapted to perform hyperframe alignment in accordance with one embodiment of the present invention. A pair of such modems can be communicatively coupled via a transmission medium, where one modem is employed at a local node (e.g., CO) and another is employed at a remote node (e.g. CPE).

The illustrated embodiment includes a transformer 205, a hybrid 210, a line driver 215, an analog front end (AFE) 220, and a processor module 225. The system interface may be coupled to, for example, a network operating in asynchronous transfer mode or synchronous transfer mode. A network operator or management entity can communicate with the modem by way of the system interface. Alternatively, the system interface may be operatively coupled to an application running on a customer's personal computer or similar equipment. The transmission medium is typically a copper wire loop or twisted pair. However, the present invention will operate with other transmission medium types as well.

Transformer 205 couples the transmission medium to the circuitry of the modem, and provides electrical isolation and a balanced interface. Hybrid 210 performs 2-to-4-wire conversion, which converts the bidirectional two-wire signal from the transmission medium into two pairs of one-directional transmissions. One pair is for receiving and the other pair is for transmitting. AFE 220 typically includes a digital-to-analog (D/A) converter 220a and an analog-to-digital (A/D) converter 220b, and may further include a gain adjust module for optimizing signals sent to processor module 225. Signals received by AFE 220 from the four-wire interface of hybrid 210 are converted from analog to digital by the A/D converter module 220b. The digital signals are then provided to processor module 225.

With regard to the transmit direction, data received from the system interface is processed by processor module 225. The digital output of processor module 225 is converted to its analog equivalent by the D/A converter 220a. The analog output of AFE 220 is provided to line driver 215, which is operatively coupled to the four-wire interface of hybrid 210. Transmitted signals are provided to the communication medium by way of transformer 205, which is operatively coupled to the two-wire interface of hybrid 210. Note that alternative embodiments may not include all components illustrated in FIG. 2, such as a transformerless design.

Processor module 225 is programmed or otherwise configured to effect a hyperframe alignment process in accordance with the principles of the present invention. In the embodiment shown, the processor module 225 includes a signal generation module 225a and a detector module 225b. The signal generation module 225a is configured to generate a specially defined TTR indication signal that is transmitted from the transmitting node to the receiving node, while the detector module 225b is configured to detect the specially defined TTR indication signal. Processor module 225 may perform a number of other functions as well, such as modulation/demodulation, encoding/decoding, scrambling/descrambling, error detection (e.g., CRC check), framing/deframing, and other algorithmic-based functions.

For purposes of discussion, assume a modem configured as illustrated in FIG. 2 is employed at both the transmitting and receiving nodes defining one direction of a communication link. The specially defined TTR indication signal can be transmitted from the transmitting node, and then detected at the receiving node.

TTR Indication Signal Generator

During initialization, the processor module 225 generates a specially defined TTR indication signal, where a uniquely identifiable signal is transmitted during one or more known symbols onto the transmission medium. Note that the signal generator module 225a can be integrated into the processor module 225 as shown, but can also exist as an independent module that is communicatively coupled with the processor module 225. For example, the signal generator module 225a can be a programmed, stand-alone module that is triggered by a request from module 225, and then provides a specially defined data pattern that can be scrambled or otherwise processed, and encoded into an established number of known DMT symbols by processor 225. In one embodiment, characteristics of the specially defined TTR indication signal are programmed into the signal generator module 225a. For instance, the programmed characteristics can specify a subset of tones included in a REVERB-type data pattern.

In another embodiment, characteristics of the specially defined TTR indication signal are kept in a storage (e.g., EEPROM or other programmable memory device) accessible by the signal generator module 225a. Once the hyperframe alignment process is initiated, the signal generator module 225a can access the signal characteristics from storage and generate the corresponding TTR indication signal. In such an embodiment, the local host could access the stored characteristics so that the specially defined TTR indication signal could be dynamically updated or otherwise modified. For instance, the specially defined TTR indication signal could be changed from REVERB33-64 (e.g., for use in a non-overlap spectrum configuration) to REVERB6-31 (e.g., for use in an overlap spectrum configuration), or vice-versa. Regardless, a specially defined TTR indication signal is transmitted during one or more known periods.

At the receiving node, the specially defined TTR indication signal is decoupled from the transmission medium by transformer 205 and provided to processor module 225 by way-of hybrid 210 and AFE 220. Based on the known characteristics of the specially defined TTR indication signal, the receiver's detector module 225b can then detect the signal, and perform hyperframe alignment.

TTR Detector

The detector module 225b at the receiving node detects the specially defined TTR indication signal during the pre-established period (e.g., DMT symbols 0 to 3). In one embodiment, linear cross-correlation is employed by the detector module 225b in performing this detection. The detector module 225b can further perform decimation on the received data before performing cross-correlation to reduce computational complexity.

Cross-Correlation:

In general, the cross-correlation of two signal sequences x(n) and y(n) is a sequence $r_{xy}(l)$ defined as:

$$r_{xy}(l) = \sum_{n=-\infty}^{\infty} x(n)y(n-l) \quad l = 0, \pm 1, \pm 2, \ldots \quad \text{(Equation 1)}$$

In one embodiment, x(n) is the time-domain REVERB33-64 signal, and y(n) is x(n) transmitted at the transmitter, passed through the receive channel h(n) and received at the receiver. Therefore, y(n) is the convolution of x(n) and h(n) defined as:

$$C_{xh}(n) = y(n) = \sum_{m=-\infty}^{\infty} x(m)h(n-m) \quad l = 0, \pm 1, \pm 2, \ldots \quad \text{(Equation 2)}$$

Inserting y(n) from Equation 2 into Equation 1, yields:

$$r_{xy}(l) = h(l) \quad l = 0, \pm 1, \pm 2, \quad \text{(Equation 3)}$$

Figure 3:
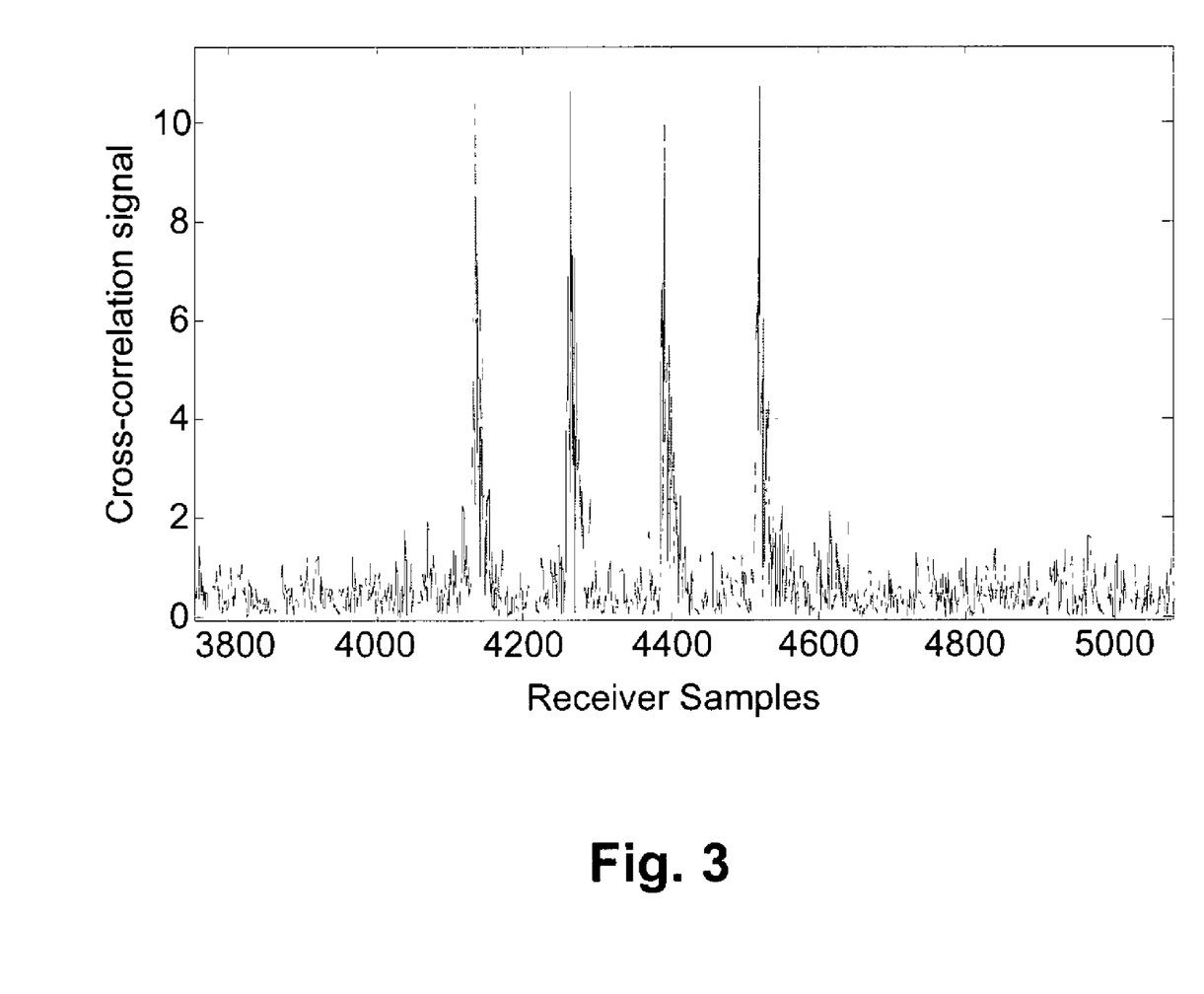
FIG. 3 illustrates an example cross-correlation signal in accordance with one embodiment of the present invention.

Equation 3 follows from the fact that x(n) is a wideband PRBS (Pseudo Random Binary Sequence) signal. As an example such signal, consider the REVERB-type signals described in the G.992.1 document. In addition, the auto-correlation of x(n) is approximately a delta function. FIG. 3 illustrates an example cross-correlation signal in accordance with one embodiment of the present invention. Here, the cross-correlation signal indicates that four consecutive REVERB33-64 signals are present in the received signal of the DMT receiver. Assume 5.5 Km of paper pulp loop and −130 dBm/Hz AWGN added at the receiver. Note that there are four well-defined correlation peaks that indicate the presence of REVERB33-64 signals in DMT symbols 0 to 3.

Decimation:

According to the Nyquist's sampling theory, a low-pass analog signal with a maximum bandwidth of $f_m$ Hz can be represented by its samples and fully reconstructed from its samples given the sampling rate $f_0$ is greater than or equal to twice the $f_m$. The analog signal with maximum band of $f_m$ Hz that has been sampled at higher sampling rates than $2f_m$ Hz, for example $4f_m$, can be decimated by 2 (discard every other sample) without loss of information. If the over-sampled analog signal carries undesired signals beyond the band of interest, it has to be filtered before decimation to avoid aliasing the undesired signal into the band of interest after decimation. This operation is called decimation filtering.

In one embodiment where the specially defined TTR indication signal is REVERB33-64 transmitted during symbols 0 to 3, the detector module 225b runs linear cross-correlation on the receiver samples continuously until it detects four consecutive REVERB33-64 signals, thereby indicating receipt of symbols 0, 1, 2 and 3. For every received DMT symbol, a cross-correlation signal will be calculated. The receiver samples can be buffered (e.g., in a RAM or other storage device operatively coupled to or included in the detector module) or otherwise preserved for analysis by the detector module 225b. Initially, when the REVERB33-64 signal is present in the receive signal, the cross-correlation peak location can be at any location within the samples of the correlation signal calculated for that receive symbol. This is because the receiver frame boundary is not yet aligned with the transmitter frame boundary. Note that the cross-correlation signal peak location is an indication of the transmitter and receiver frame boundary offset, which enables hyperframe alignment. In this sense, symbols 0 to 3 have pre-established indicia of hyperframe alignment.

The detector module 225b then performs a frame boundary alignment based on the cross-correlation signal peak location, and runs the correlation again to search for the next hyperframe's N REVERB33-64 signals. If the frame boundary alignment is done properly based on detection of the first four consecutive REVERB33-64 signals, the next four REVERB33-64 signals (in the next hyperframe) will be detected with their cross-correlation peak being at a known sample (e.g., such as the first sample) of the cross-correlation signal. Thus, a known offset between the transmitter and receiver frame boundaries is established. In particular, the fourth detection of the REVERB33-64 signal with a peak location at the known sample of the cross-correlation signal indicates the boundary of DMT symbol 3 in the hyperframe. Thus, the receiver has achieved hyperframe alignment.

Note that the current-standard-based tone 48 (conventional TTR indication signal) phase toggling can still take place without affecting the detector module's performance. Further note that tone 64 (conventional pilot signal) is included in REVERB33-64. Thus, the present invention provides backwards compatibility.

Implementation Details

In one embodiment, processor module 225 is a digital signal processor (DSP) or other suitable processing environment that is programmed to carry out hyperframe alignment or initial handshake synchronization in accordance with the principles of the present invention. In an alternative embodiment, processor module 225 is implemented in purpose-built silicon as an ASIC or chip set. A combination of DSP and ASIC technology can also be used to implement processor module 225. Thus, the present invention can be utilized by, for example, an ADSL service provider as a method for performing hyperframe alignment. Alternatively, the present invention can be incorporated into a device such as a modem, a programmable DSP, or a purpose-built chip/chip set. Alternatively, the present invention can be incorporated into a system, such as a transceiver pair where one or both transceivers is adapted to carry out hyperframe alignment, or initial handshake synchronization as will be discussed in turn. Alternatively, the present invention can be incorporated into an apparatus such as a computer program product embodied on a computer readable medium, such as a server or disk.

Note that modules not shown may also be included in the modem depending on the particular application. For example, the modem may be configured to operate in an overlap spectrum application and include an echo canceller module. Other modules (e.g., transmitter and receiver clocks) and configurations will be apparent in light of this disclosure. Further note that processor module 225 can self-initiate the hyperframe alignment process as part of the link initialization procedures. Alternatively, an event (e.g., detected loss of alignment) or a control signal from the host (e.g., align hyperframe software call or logic enable line) can be used to trigger the alignment process. Likewise, processor module 225 can enter the hyperframe alignment process after detecting hyperframe alignment was initiated by a remote modem. Typically, the ATU-C modem will initiate the hyperframe alignment process. However, the ATU-R can be configured to initiate the process if so desired.

Methodology

Figure 4:
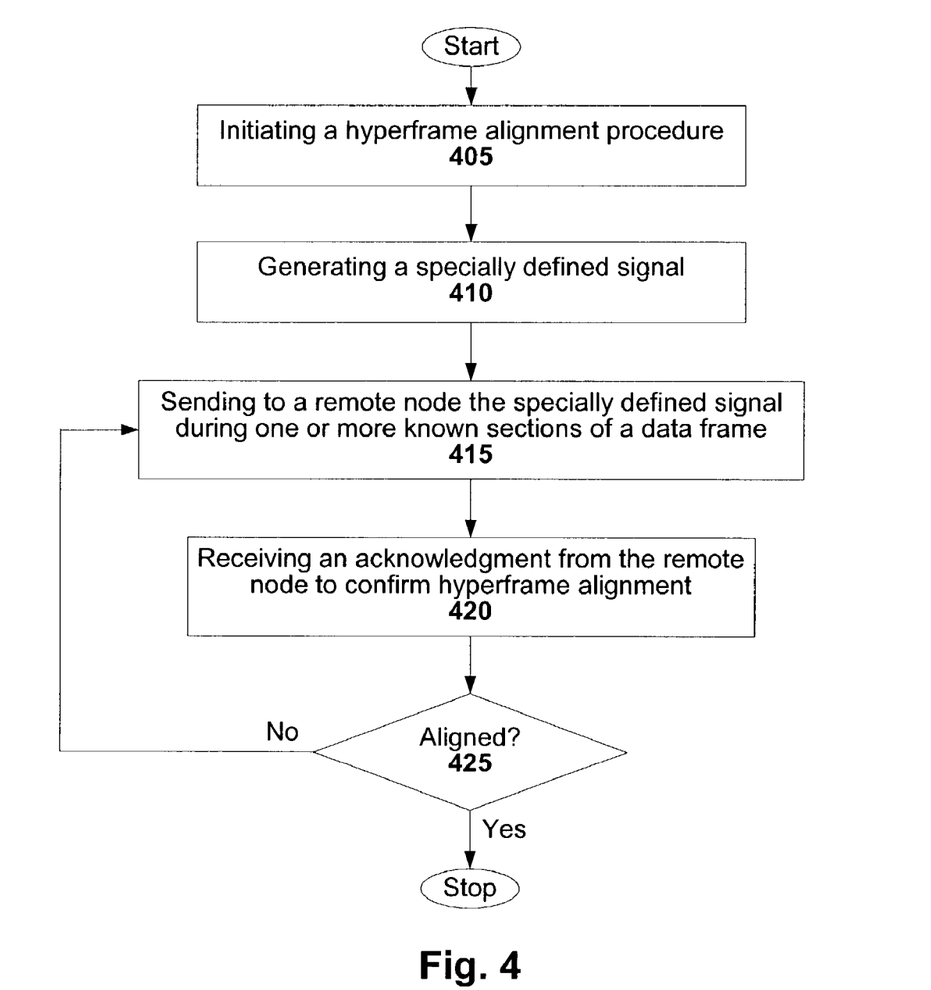
FIG. 4 is a flowchart illustrating a method for performing hyperframe alignment in accordance with an embodiment of the present invention.

FIG. 4 is a flowchart illustrating a method for performing hyperframe alignment in accordance with an embodiment of the present invention. This method is generally carried out in a communication system (e.g., ADSL Annex C) including two modems that are communicatively coupled by a transmission medium. In particular, the method is carried out at a transmitting node associated with a particular communication direction of the system. The modems at both the transmitting (e.g., local) and receiving (e.g., remote) nodes may be configured, for example, as discussed in reference to FIG. 2. However, other configurations will be apparent in light of this disclosure.

The method begins with initiating 405 a hyperframe alignment procedure. In one embodiment, the hyperframe alignment procedure is initiated by the ATU-C during initialization (e.g., during training phase) of the communication link. Alternative embodiments, however, may initiate the alignment procedure at other times as well (e.g., after a disruption in service). The method further includes generating 410 a specially defined signal, and sending 415 to a remote node the specially defined signal during one or more known sections of a data frame.

In one embodiment, the data frame is an ADSL downstream hyperframe having DMT symbols 0 to 344, and the one or more known sections of the data frame are DMT symbols 0 to 3 of the hyperframe. The first transmission of this data frame would allow the offset between the transmitter and receiver symbol boundaries to be identified as previously explained. A second (or more) transmission of this frame would allow hyperframe alignment confirmation. Alternatively, the one or more known sections of the data frame are symbols $N_1$ to $N_2$ (e.g., 140 to 144) of the hyperframe, and symbols $N_3$ to $N_4$ (e.g., 237 to 241) of the hyperframe. In such an embodiment, the specially defined signal sent during symbols $N_1$ to $N_2$ would allow the offset between the transmitter and receiver symbol boundaries to be identified, and the specially defined signal sent during symbols $N_3$ to $N_4$ allow hyperframe alignment confirmation.

The specially defined signal can be, for example, a pseudo random data sequence or other uniquely identifiable signal. In one embodiment, the specially defined signal is a sub-set of the tones included in a REVERB-type signal as previously discussed (e.g., REVERB6-31, REVERB16-31, REVERB33-64, or REVERBx-y, where x to y represent a set of tones available for transmitting information over a long loop). Such a specially defined signal is transmitted during the known sections of the data frame thereby providing a robust TTR indication signal that can be detected at the remote end of a long loop.

The method may further include receiving 420 an acknowledgment from the remote node to confirm hyperframe alignment, and determining 425 if alignment has been achieved based on the acknowledgment. If the acknowledgement confirms hyperframe alignment, then the procedure concludes. The communication system can then complete any other initialization procedures and transition to data mode (e.g., Showtime). If, however, the acknowledgement confirms non-alignment, then steps 415 through 420 can be repeated. As previously explained, the transmitting transceiver can be configured to manifest an error if a positive acknowledgement is not received after a number of attempts (e.g., transmission of N hyperframes).

Figure 5:
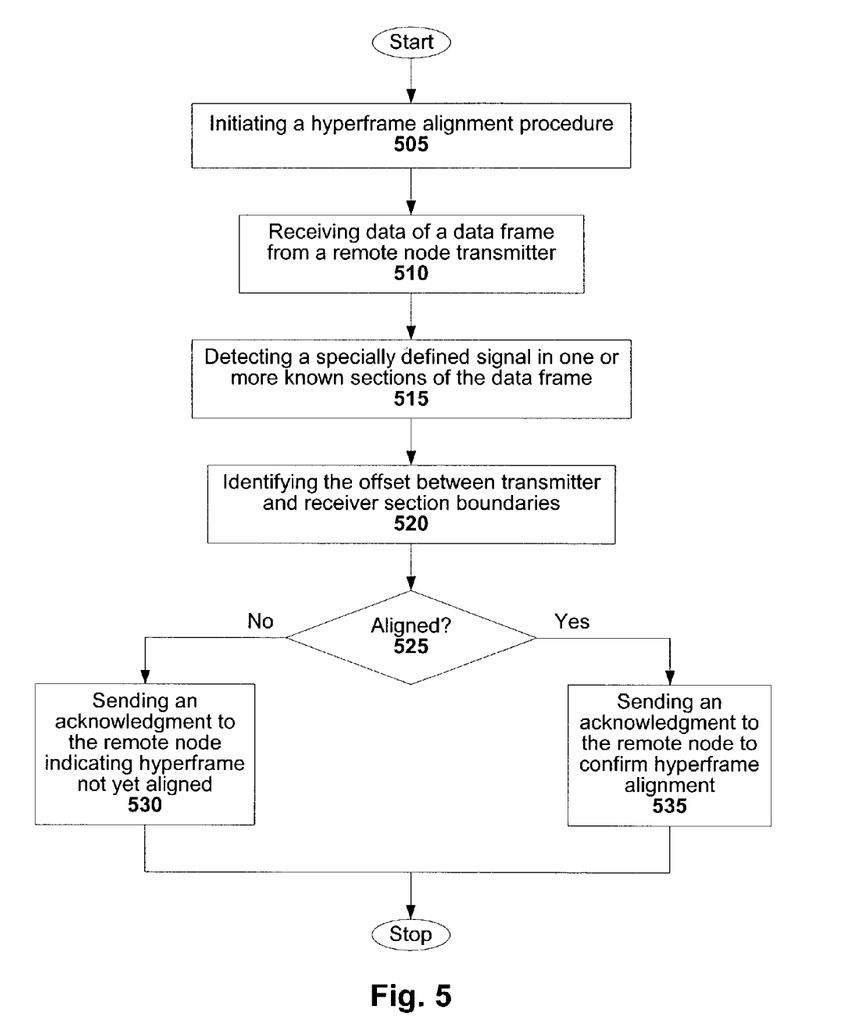
FIG. 5 is a flowchart illustrating a method for performing hyperframe alignment in accordance with another embodiment of the present invention.

FIG. 5 is a flowchart illustrating a method for performing hyperframe alignment in accordance with another embodiment of the present invention. Here, the method is carried out at a receiving node associated with a particular communication direction of the communication system.

The method begins with initiating 505 a hyperframe alignment procedure (e.g., ATU-C during training phase of initialization of the communication link). The method further includes receiving 510 data of a data frame from a remote node transmitter, and detecting 510 a specially defined signal in one or more known sections of the data frame. The previous discussion relevant to the defined signal and known symbols applies here as well. The method proceeds with identifying 520 the offset between transmitter and receiver section boundaries, and determining 525 if hyperframe alignment has been achieved. Particular embodiments for carrying out these steps will now be discussed.

For purposes of discussion, assume that the specially defined signal transmitted during known sections of the data frame is a REVERBx-y signal transmitted during symbols 0 to 3 of a hyperframe. In one embodiment, the offset between transmitter and receiver section boundaries is identified by running a linear cross-correlation on receiver samples continuously until four consecutive REVERBx-y signals are detected (thereby indicating symbols 0 to 3). The transmitter and receiver frame boundary offset can then be identified based on cross-correlation signal peaks of the REVERBx-y signals. The linear cross-correlation can be repeated on a subsequent hyperframe (e.g., the next hyperframe), and a next four consecutive REVERBx-y signals can be detected. In response to the next four REVERBx-y signals being detected with their cross-correlation peak being at a known sample (e.g., first sample) of the cross-correlation signal, hyperframe alignment is achieved.

In another embodiment, the offset between transmitter and receiver section boundaries is identified by calculating a cross-correlation signal for every received DMT symbol, and identifying N consecutive DMT symbols having pre-established indicia of hyperframe alignment in their cross-correlation signal. The pre-established indicia may include, for example, a set (x-y) of tones included in a pseudo random data sequence (such as tones 33-64 of a REVERB signal). The frame boundary alignment can be performed based on the peak location of the cross-correlation signals having the indicia. The cross-correlation can be run a second time to identify a second set of N consecutive DMT symbols. This second detection of pre-established indicia confirms the frame boundary alignment thereby indicating hyperframe alignment is achieved. Note that the second cross-correlation can take place in the same hyperframe, or in a subsequent hyperframe. Further note that the process can be run third, fourth, fifth, etc. times to ensure proper alignment.

If hyperframe alignment is not achieved, the method may further include sending 530 an acknowledgment to the remote node indicating that the hyperframe alignment is not achieved. Such an acknowledgment signal may be, for example, a specially defined signal, or simply a period of silence. Here, the receiving transceiver can be configured to manifest an error if a positive acknowledgement is not received after a number of attempts (e.g., transmission of a number of hyperframes). If, however, the hyperframe alignment is achieved, the method proceeds with sending 535 an acknowledgment to the remote node to confirm hyperframe alignment. The communication system can then complete any additional initialization procedures (e.g., channel analysis and exchange) and transition to data mode (e.g., Showtime).

General Overview of Initialization Process

Figure 6:
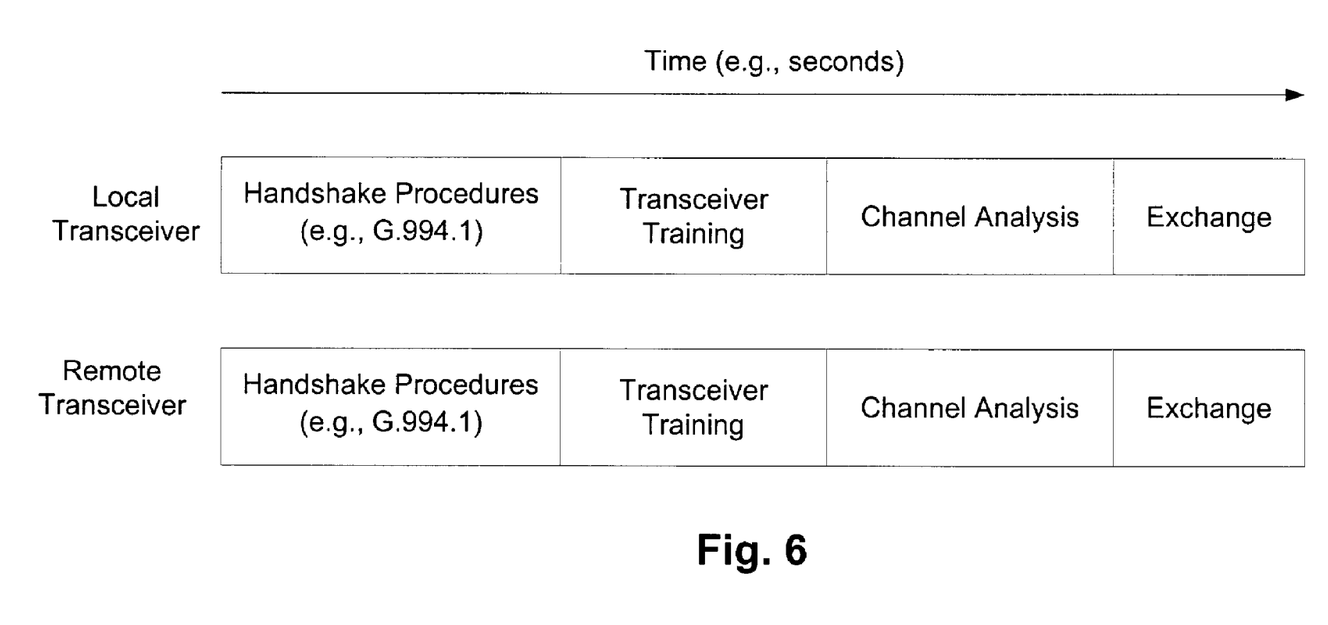
FIG. 6 is a timeline illustrating an overview of the initialization process in accordance with one embodiment of the present invention.

FIG. 6 is a timeline illustrating an overview of the initialization process in accordance with one embodiment of the present invention. Assume that the initialization process is being carried out in a communication system having one or more ADSL transceiver pairs, each communicatively coupled by a copper twisted pair or other transmission medium.

The initialization process illustrated for each transceiver includes an initial handshake session followed by transceiver training and channel analysis procedures. Information learned during the training and analysis procedures is then exchanged. The handshake session generally allows newly coupled transceivers to exchange capabilities and to select a common mode of operation. This initial handshaking session is typically carried out in accordance with ITU-T recommendation 994.1 (G.hs) or other suitable handshaking procedures.

However, conventional G.994.1 is not synchronized to TCM-ISDN, which applies a time-division duplex scheme based on the TTR as previously explained. Therefore, G.994.1 signals are interfered with by NEXT of the TCM-ISDN or Annex C FBM, particularly on long loops (e.g., longer than 5 km). As a result, the handshake procedure may fail. Hence, there is a need to improve G.994.1 reliability and robustness for G.992 Annex C modems.

One embodiment of the present invention allows the G.994.1 to be synchronized to the TCM-ISDN, where the synchronization is achieved during the front end of the handshake procedure. Thus, the G.994.1 signals can be exchanged, for example, during the FEXT time periods on long loops, and transmission during the NEXT time periods can be avoided. A more robust and reliable handshake procedure is therefore realized.

Annex C G.994.1 Synchronized to TTR

Figure 7:
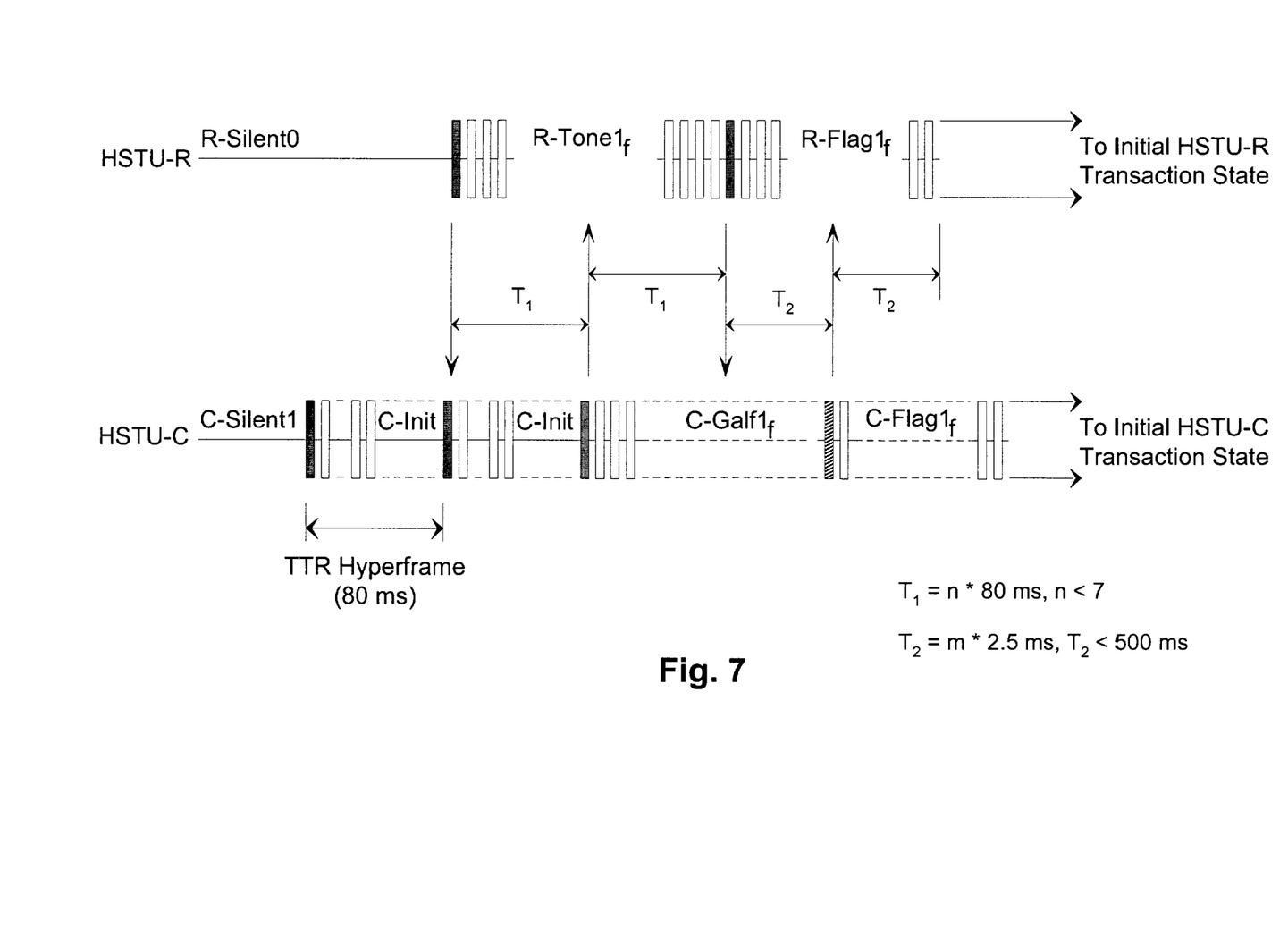
FIG. 7 is a flow diagram illustrating an initialization procedure in accordance with an embodiment of the present invention.

FIG. 7 is a flow diagram illustrating a duplex initialization procedure in accordance with an embodiment of the present invention. In particular, a G.994.1 handshake procedure is synchronized to the TTR. Once the handshake procedure is synchronized to the TTR, the NEXT and FEXT symbol periods are known. G.hs signals (and possibly other initialization signals, such training signals, if so desired) can then be transmitted purposely during the other modem's FEXT period to ensure a robust exchange.

During the handshake procedure, the communicating modems are referred to as the HSTU-C and HSTU-R. The existing HSTU-R initiating signal (R-TONES-REQ) has phase reversals every 16 ms, and the TTR has a period of 80 ms, which is 5×16 ms. In accordance with one embodiment of the present invention, an HSTU-C TTR indication signal is defined so it can be reliably received by the HSTU-R that is transmitting R-TONES-REQ, whose phase reversals are not synchronized to TTR and may prevent good, reception for a short period every 16 ms.

HSTU-C Initiated Handshake Procedure

Referring to FIG. 7, the HSTU-C starts by transitioning from C-SILENT1, and sending a specially defined handshake signal referred to as C-INIT at the beginning of a TTR hyperframe. C-INIT can be, for example, a REVERB16-31 or other specially defined signal as previously described. In one embodiment, C-INIT is transmitted during DMT FEXT$_R$ symbols 0-3, 33-36, 108-111 and 140-144. This specially defined signal enables synchronization to the TTR, which in turn enables a synchronized G.hs procedure where handshake signals are transmitted during FEXT symbols only as illustrated in FIG. 7. Subsequent initialization procedures, such as training, channel analysis, and exchange can maintain synchronization to the TTR if so desired. Alternatively, the synchronization can be re-established in those subsequent procedures.

Note that this sequence of DMT symbols was chosen for its robustness in the presence of phase reversals spaced 16 ms apart at arbitrary phases of the TTR period. As previously explained, other data patterns and symbol combinations can also be used here to achieve a reliable transmission and detection in accordance with the principles of the present invention.

Figure 1A:
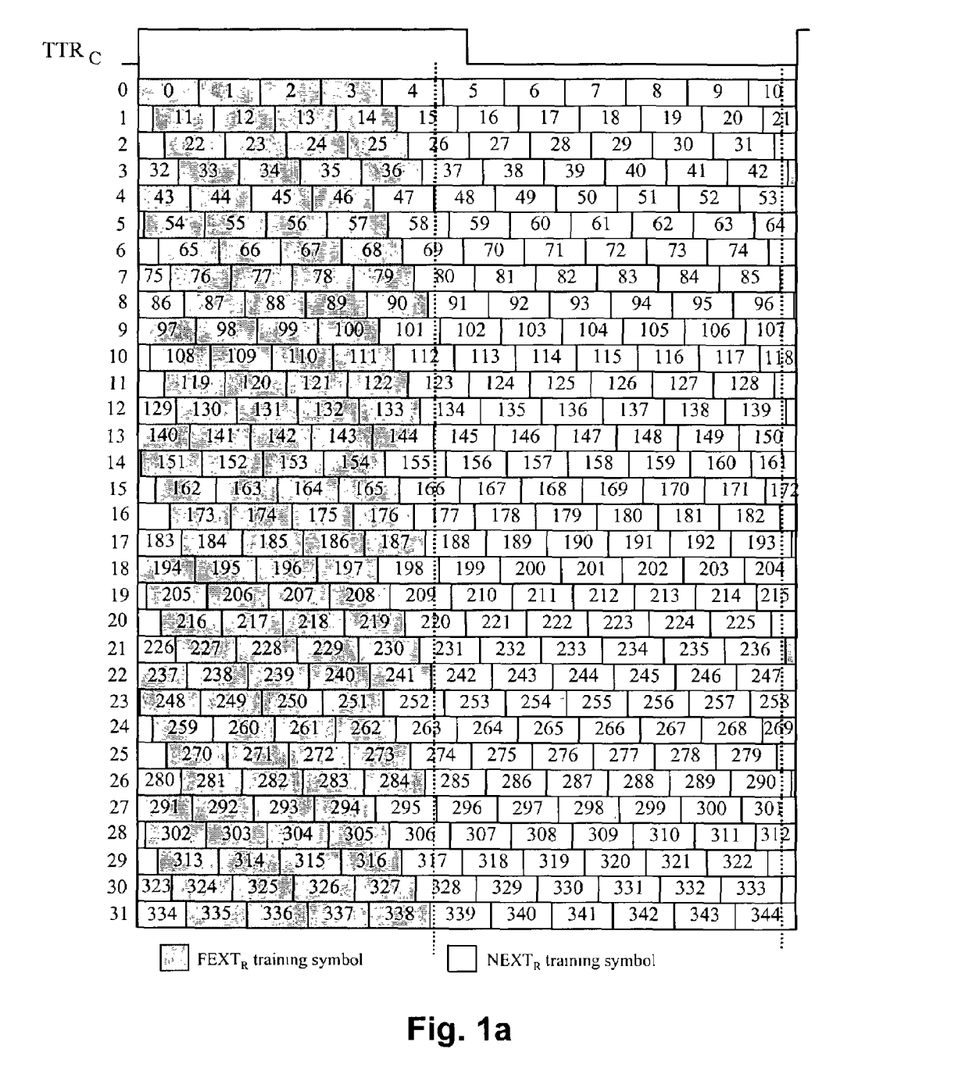
FIG. 1a illustrates a downstream ADSL Annex C hyperframe structure.
Figure 1B:
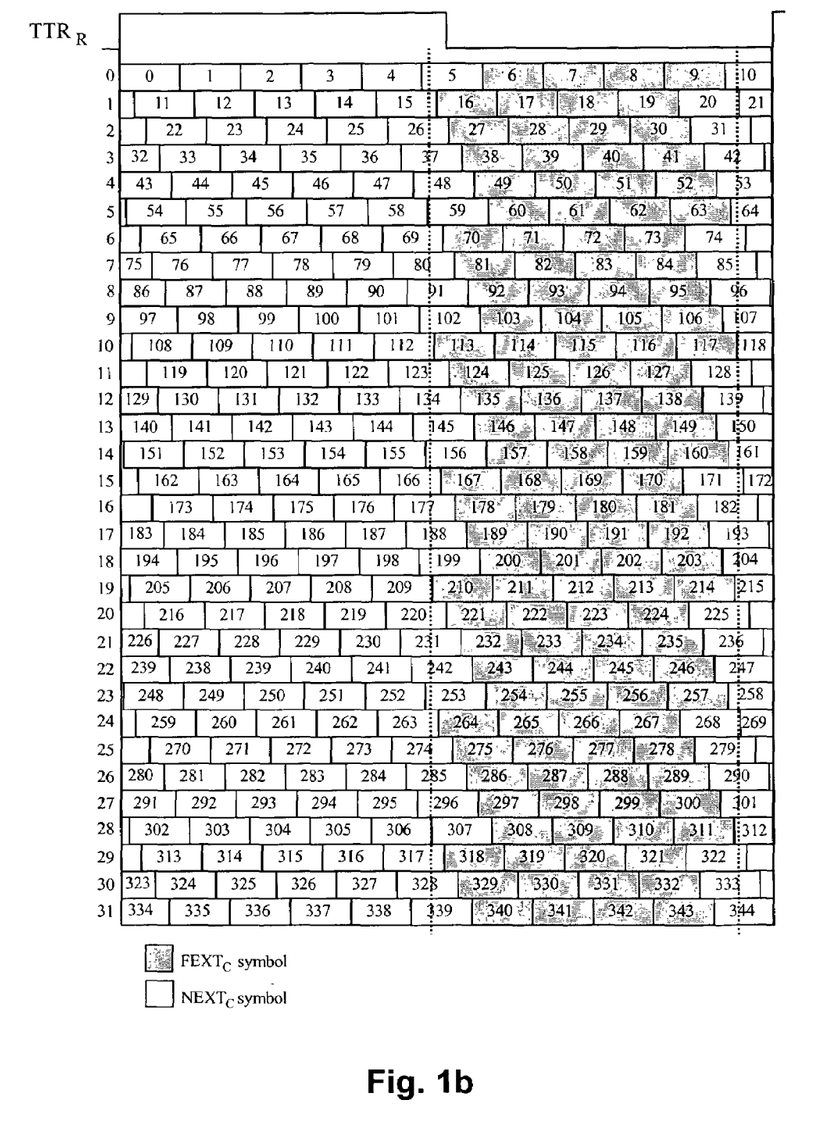
FIG. 1b illustrates an upstream ADSL Annex C hyperframe structure.

Upon detection of C-INIT (e.g., TTR Detector as previously described), the HSTU-R sets its PGA, and performs symbol alignment and timing recovery. In addition, the HSTU-R transmits R-TONE1$_f$ during the FEXT$_C$ symbols, starting with symbols 6-9 and followed by symbols 16-19, 27-30, . . . 210-214, . . . 340-343 (shown in FIG. 1$b$). In one embodiment, if the HSTU-R detects C-TONES (conventional handshake signal), it may wait for a timeout T1 to determine whether the HSTU-C supports the G.hs procedure in accordance with the principles of the present invention before responding appropriately.

After detecting R-TONE1$_f$ the HSTU-C sends C-GALF1$_f$ starting at the beginning of a TTR hyperframe, during FEXT$_R$ symbols only. Each bit is sent in the first 4 FEXT$_R$ symbols of a subframe (0-3, 11-14, 22-25, 33-36, . . . 140-143, . . . 335-338). 32 bits are sent in the 80 ms hyperframe. Recall that an G.992 hyperframe includes 345 DMT symbols. There are 32 subframes in a hyperframe and a subframe is 10-11 consecutive DMT symbols according to TTR timing.

After receiving C-GALF1$_f$ the HSTU-R sends R-FLAG1$_f$ during the FEXT$_C$ symbols, starting with symbols 6-9 (as was done for R-TONE1$_f$). After receiving R-FLAG1$_f$, the HSTU-C sends C-FLAG1$_f$ during the first four FEXT$_R$ symbols in a subframe, starting in any TTR subframe. When the HSTU-R has detected C-FLAG$_1$, then the HSTU-R can begin the first handshake transaction, starting in any TTR subframe.

HSTU-R Initiated Handshake Procedure

It is beneficial that the HSTU-C initiates the handshaking procedure since the HSTU-R will be locked to TTR from the beginning. As such, no signal is sent during NEXT periods. However, the HSTU-R may initiate the handshaking procedure by transitioning from R-SILENT0 and sending R-INIT. In one embodiment, R-INIT is REVERB6-15, but other specially defined TTR indication signals can be used here as well as previously described. After receiving R-INIT, the HSTU-C sends C-INIT starting at the beginning of a TTR hyperframe as discussed in reference to HSTU-C initiated procedure.

Note that R-INIT is sent before the HSTU-R receives a signal from the HSTU-C that is locked to TTR. To avoid NEXT, which may affect modems on adjacent pairs, the HSTU-R can be configured to detect the noise pattern, and transmit R-INIT only during high noise level (FEXT$_C$ period).

Fallback Procedure/Backwards Compatibility

As previously stated, the present invention provides backwards compatibility with conventional initialization procedures. For instance, assume that the HSTU-C initiates the handshake procedure by sending C-INIT, and the HSTU-R does not respond. The reason for non-response may be, for example, that the HSTU-R is not connected, it does not support the initialization procedures in accordance with the principles of the present invention or it has determined that conventional G.994.1 handshake procedure is better for the given loop.

After a timeout, a fall back procedure can be engaged. For example, the HSTU-C can be configured to send C-TONES. If the HSTU-R responds with R-TONE1, then the transceiver pair will fall back to conventional G.994.1 initialization procedures. If, however, the HSTU-R does not respond to C-TONES, then the HSTU-C can be configured to send C-INIT again after a timeout. These alternations can be continued a number of times until the HSTU-R affirmatively responds or possibly some longer timeout expires. Such alternating may lead to fewer interoperability problems with existing G.994.1 devices.

The duration of the alternations can be pre-established or otherwise defined so that an HSTU-R knows how long to monitor the incoming signal to determine whether or not the HSTU-C is configured in accordance with the principles of the present invention. The HSTU-R can then respond accordingly. Note also that the TTR indication signals in accordance with the principles of the present invention may also be sent in parallel with existing G.994.1 initiating signals.

On the other hand, assume that an HSTU-R initiates the handshake procedure by sending R-INIT, and the HSTU-C does not respond (for whatever reason). After a timeout of T2, the HSTU-R can be configured to send R-TONES-REQ (a conventional handshake signal). If the HSTU-C responds with C-TONES, then the transceiver pair will fall back to conventional G.994.1 and initialization procedures. If, however, the HSTU-C responds to R-INIT with C-INIT, and the HSTU-R subsequently decides to fall back to conventional G.994.1 (e.g., because the HSTU-R determines that the loop is not long enough and conventional G.994.1 is suitable), then the HSTU-R can send silence. The HSTU-C will time out and alternate back to the conventional G.994.1, and send C-TONES.

Flags and Messages

Note that conventional G.994.1 needs to repeat the same information bit in 8 consecutive DMT symbols. In each TTR subframe (as illustrated in FIG. 1$a$), there are typically 4-5 FEXT$_R$ symbols and 6-7 NEXT$_R$ symbols. In one embodiment of the present invention, the first 4 FEXT$_R$ symbols in one subframe are used to transmit one bit. Thus, each bit of information is sent in 4 consecutive FEXT$_R$ symbols. In another embodiment, all the FEXT symbols (4 or 5) in a subframe are used to transmit one bit. Thus, each bit of information is sent in 4 or 5 consecutive FEXT$_R$ symbols. Such an embodiment uses 345 symbols to send 32 bits of information, an average of 10.78 DMT symbols per G.hs bit. The modems transmit only FEXT symbols, similar to ADSL Annex C FBM mode. The receiver algorithm may be simplified since echo does not exist.

In an alternative embodiment of the present invention, all the symbols in one TTR period are used to send one bit of information, regardless of FEXT or NEXT symbols. The receiving node can be configured with two receivers, one for FEXT symbols and the other for the NEXT symbols. The results of two receiver detectors are compared and the more reliable one is used (e.g., based on CRC check). Under TCM-ISDN noise, the FEXT detector provides a more reliable result. However, under other noise conditions, the NEXT detector may help to improve reliability. Such an embodiment involves a greater degree of receiver complexity, as well as loss of advantage of half-duplex mode (e.g., echo cancellation is required).

Note that the handshake signals (e.g., C-INIT, R-TONE1$_f$, R-INIT) and message durations for the handshake procedure are multiples of either the TTR hyperframe, which is 80 milliseconds in length, or the subframe, which is about 2.5 milliseconds in length. Synchronization to the TTR during the transition from G.hs to the Annex C operating mode may or may not be maintained. Since Annex C needs to work with the existing G.994.1 procedures that are not synchronized to TTR, it needs to perform its own TTR synchronization anyway.

After the initial synchronization, the HSTU-C and HSTU-R can maintain the synchronization to TTR. Since the TTR clock is available at the HSTU-C, the HSTU-C can lock its transmitter clock to the TTR. The HSTU-R can then perform timing recovery from the signal received from the HSTU-C. In one embodiment, the timing recovery at the HSTU-R is performed based on the received handshake signals in a loop-back timing scheme. For example, loop-back timing is performed where the HSTU-R transmitter clock is locked to the HSTU-R receiver clock, which is locked to the HSTU-C transmitter clock, which is locked to the TTR. In another embodiment, a dedicated pilot tone is transmitted from the HSTU-C to the HSTU-R to enable timing recovery. This pilot tone can be transmitted in all DMT symbols. As an example, tone 16 can be used as the pilot tone.

Parallel Decoding for Mixed SNR Environment

As previously discussed, the G.hs receiver decodes received information under different noise conditions in the NEXT and FEXT bitmaps. Furthermore, there are also 1-2 symbols in the transition from NEXT to FEXT noise during any single TTR period. This mixed SNR environment during a single TTR period requires further optimization for the optimal decoding of the G.hs information stream. Since a single bit of information is carried over N consecutive symbols, one embodiment of the present invention employs up to N parallel receivers running during each bit time (e.g., N=8). After reception of the complete G.hs frame, an error check (e.g., CRC) can be computed on each of these receivers. The bit stream from the receiver associated with the correct CRC is used.

The foregoing description of the embodiments of the invention has been presented for the purposes of illustration and description. It is not intended to be exhaustive or to limit the invention to the precise form disclosed. Many modifications and variations are possible in light of this disclosure.

For example, some specific applications discussed herein employ a specially defined TTR indication signal to establish hyperframe alignment or to lock a G.hs procedure to the TTR. However, a specially defined indication signal in accordance with the principles of the present invention can generally be used to synchronize a particular procedure or event to a given reference. Once synchronization is established, known characteristics associated with the synchronized relationship can be exploited. One example herein is where the G.hs signals are synchronized with the TTR. Known characteristics associated with this synchronization include identifiable FEXT and NEXT time periods. Given this knowledge, a more robust and reliable communication can take place. Other applications having such synchronized relationships can equally benefit from the present invention.

It is intended that the scope of the invention be limited not by this detailed description, but rather by the claims appended hereto.

The invention claimed is:

1. A method for synchronizing an initialization procedure with TTR in an ADSL Annex C communication system having a transmitting node and a receiving node that are communicatively coupled, the method comprising:
   transmitting a specially defined signal during one or more sets of known FEXT symbols of a first outgoing hyperframe, so that when detected at the receiving node, the specially defined signal establishes synchronization to TTR thereby enabling a synchronized initialization procedure, wherein the synchronized initialization procedure includes:
   receiving a first response signal during one or more sets of FEXT symbols of a first incoming hyperframe to confirm receiving node detection of the specially defined signal.

2. The method of claim 1 further comprising:
   in response to detecting the first response signal, transmitting a second signal during FEXT symbols of a second outgoing hyperframe.

3. The method of claim 2 further wherein the second outgoing hyperframe includes a number of subframes made up of FEXT and NEXT symbols, and bits of the second signal are sent in the first four FEXT symbols of each subframe.

4. The method of claim 2 further comprising:
   receiving a second response signal during one or more sets of FEXT symbols of a second incoming hyperframe to confirm receiving node detection of the second signal.

5. The method of claim 4 further comprising:
   in response to detecting the second response signal, transmitting a third signal during FEXT symbols of a third outgoing hyperframe.

6. The method of claim 5 further wherein the third outgoing hyperframe includes a number of subframes made up of FEXT and NEXT symbols, and bits of the third signal are sent in the first four FEXT symbols of each subframe.

7. A method for synchronizing an initialization procedure with TTR in an ADSL Annex C communication system having a transmitting node and a receiving node that are communicatively coupled, wherein the method is initiated by a remote transceiver at the receiving node, the method comprising:
   receiving a second specially defined signal from the remote transceiver during one or more sets of known FEXT symbols of a first incoming hyperframe, and transmission takes place in response to detecting the second specially defined signal; and
   transmitting a first specially defined signal
   during one or more sets of known FEXT symbols of a first outgoing hyperframe, so that when detected at the receiving node, the first specially defined signal establishes synchronization to TTR thereby enabling a synchronized initialization procedure.

8. A method for synchronizing an initialization procedure with TTR in an ADSL Annex C communication system having a transmitting node and a receiving node that are communicatively coupled, the method comprising:
   transmitting a specially defined signal during one or more sets of known FEXT symbols of a first outgoing hyperframe, so that when detected at the receiving node, the specially defined signal establishes synchronization to TTR thereby enabling a synchronized initialization procedure; and
   engaging a fall back procedure in response to the receiving node not responding to the transmitted specially defined signal.

9. A method for synchronizing an initialization procedure with TTR in an ADSL Annex C communication system having a transmitting node and a receiving node that are communicatively coupled, the method comprising:
   transmitting a specially defined signal during one or more sets of known FEXT symbols of a first outgoing hyperframe, so that when detected at the receiving node, the specially defined signal establishes synchronization to TTR thereby enabling a synchronized initialization procedure; and
   alternately sending the specially defined signal and a conventional signal a number of times until an affirmative response is received from the receiving node.

* * * * *